US012665705B2

(12) United States Patent
Lei

(10) Patent No.: US 12,665,705 B2
(45) Date of Patent: Jun. 23, 2026

(54) METHOD AND APPARATUS FOR HARQ-ACK FEEDBACK FOR SEMI-PERSISTENT SCHEDULING TRANSMISSION

(71) Applicant: Lenovo (Beijing) Limited, Beijing (CN)

(72) Inventor: Haipeng Lei, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 322 days.

(21) Appl. No.: 18/552,986

(22) PCT Filed: Apr. 1, 2021

(86) PCT No.: PCT/CN2021/084887
§ 371 (c)(1),
(2) Date: Sep. 28, 2023

(87) PCT Pub. No.: WO2022/205296
PCT Pub. Date: Oct. 6, 2022

(65) Prior Publication Data
US 2024/0187142 A1 Jun. 6, 2024

(51) Int. Cl.
*H04L 1/1829* (2023.01)
*H04L 5/00* (2006.01)

(52) U.S. Cl.
CPC .......... *H04L 1/1854* (2013.01); *H04L 1/1864* (2013.01); *H04L 5/0055* (2013.01)

(58) Field of Classification Search
CPC ... H04L 1/1854; H04L 1/1864; H04L 5/0055; H04L 1/1896; H04W 4/06
(Continued)

(56) References Cited

U.S. PATENT DOCUMENTS

2016/0309461 A1 10/2016 Yin et al.
2019/0132092 A1 5/2019 Chen et al.
(Continued)

FOREIGN PATENT DOCUMENTS

CN 112219420 A 1/2021
CN 112753263 A 5/2021
(Continued)

OTHER PUBLICATIONS

ZTE, "Mechanisms to Improve Reliability for RRC_CONNECTED UEs", R1-2008827, Oct. 26 Nov. 13, 2020. (From Applicant's IDS) (Year: 2020).*
"Communication Pursuant to Rule 164(1) EPC", EP Application No. 21933955.3, Nov. 13, 2024, 13 pages.
PCT/CN2021/084887 , "International Preliminary Report on Patentability", PCT Application No. PCT/CN2021/084887, Oct. 12, 2023, 6 pages.
PCT/CN2021/084887 , "International Search Report and Written Opinion", PCT Application No. PCT/CN2021/084887, Jan. 4, 2022, 7 pages.
(Continued)

*Primary Examiner* — Mang Hang Yeung
(74) *Attorney, Agent, or Firm* — FIG. 1 Patents

(57) ABSTRACT

Embodiments of the present disclosure relate to HARQ-ACK feedback transmission. According to some embodiments of the disclosure, a method may include: receiving configuration information for an SPS PDSCH configuration; receiving, in a first slot, a first DCI format for activating the SPS PDSCH configuration, wherein the first DCI format is received by a plurality of UEs including the UE; determining, based on the configuration information, a first PUCCH resource and a second slot for transmitting HARQ-ACK feedback for the first DCI format; and transmitting, in the second slot, the HARQ-ACK feedback for the first DCI format on the first PUCCH resource.

20 Claims, 6 Drawing Sheets

400 ⌐ transmitting, to a UE, configuration information for a SPS PDSCH configuration ⌐ 411 transmitting, to a plurality of UEs including the UE, a first DCI format in a first slot for activating the SPS PDSCH configuration ⌐ 413 receiving, from the UE, HARQ-ACK feedback for the first DCI format on a first PUCCH resource in a second slot ⌐ 415

(58) Field of Classification Search
USPC ......................................................... 370/329
See application file for complete search history.

(56) References Cited

U.S. PATENT DOCUMENTS

| | | | |
|---|---|---|---|
| 2021/0099980 A1* | 4/2021 | Khoshnevisan | ...... H04L 1/1864 |
| 2021/0227570 A1* | 7/2021 | Park | ........................ H04L 1/189 |
| 2023/0291505 A1* | 9/2023 | Park | ...................... H04L 1/1861 |

FOREIGN PATENT DOCUMENTS

| | | | |
|---|---|---|---|
| EP | 3780717 A1 | 2/2021 |
| KR | 20200116392 A | 10/2020 |
| WO | 2020096438 A1 | 5/2020 |

OTHER PUBLICATIONS

ZTE , "Mechanisms to Improve Reliability for RRC_ CONNECTED UEs", 3GPP TSG RAN WG1 Meeting #103-e, R1-2008827, e-Meeting [retrieved Oct. 12, 2023]. Retrieved from the Internet <https://www.3gpp.org/ftp/tsg_ran/WG1_RL1/TSGR1_ 103-e/Docs>, Oct. 2020, 5 pages.
"Extended European Search Report", EP Application No. 21933955. 3, Feb. 3, 2025, 11 pages.

* cited by examiner

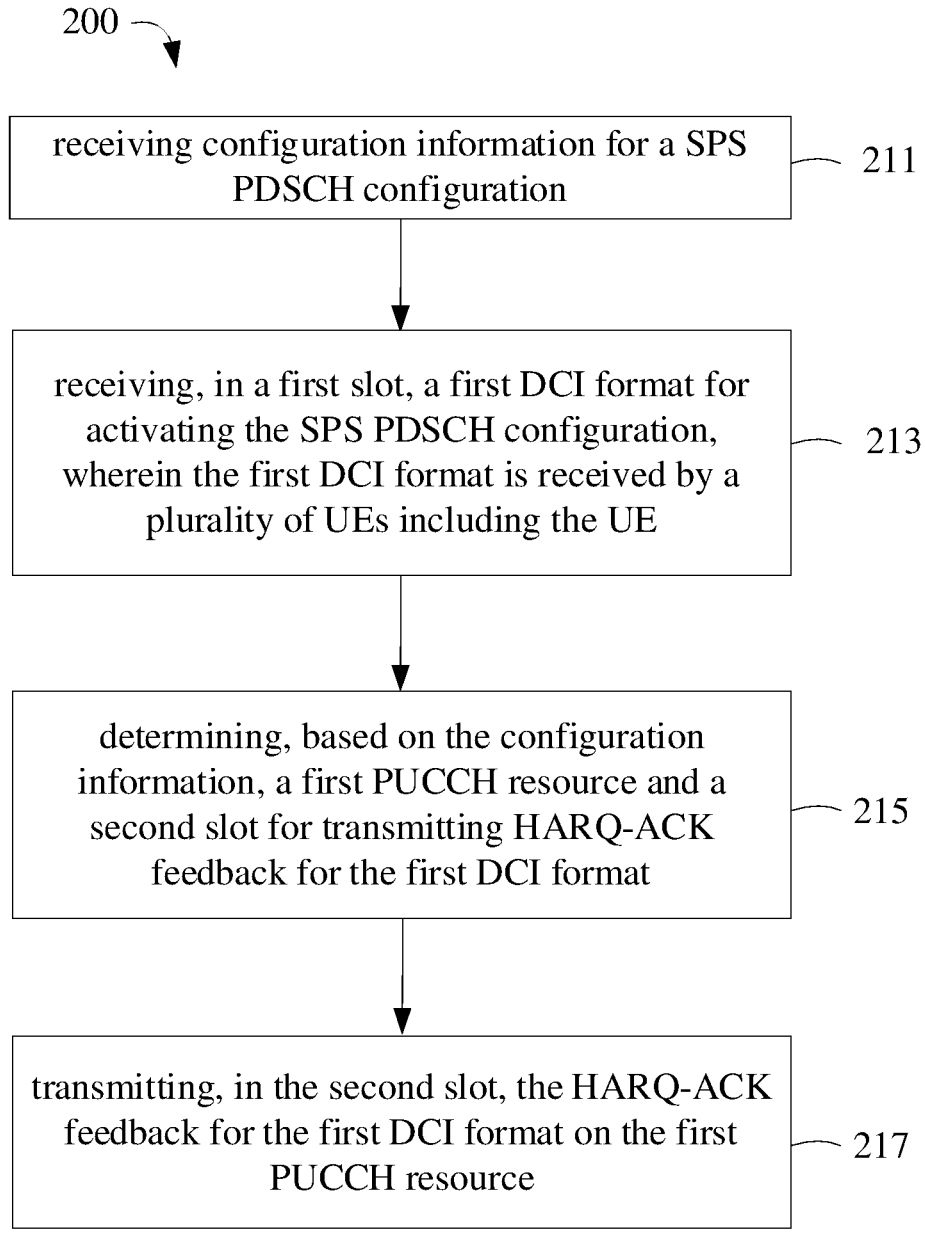

200 receiving configuration information for a SPS PDSCH configuration — 211 receiving, in a first slot, a first DCI format for activating the SPS PDSCH configuration, wherein the first DCI format is received by a plurality of UEs including the UE — 213 determining, based on the configuration information, a first PUCCH resource and a second slot for transmitting HARQ-ACK feedback for the first DCI format — 215 transmitting, in the second slot, the HARQ-ACK feedback for the first DCI format on the first PUCCH resource — 217

FIG. 2

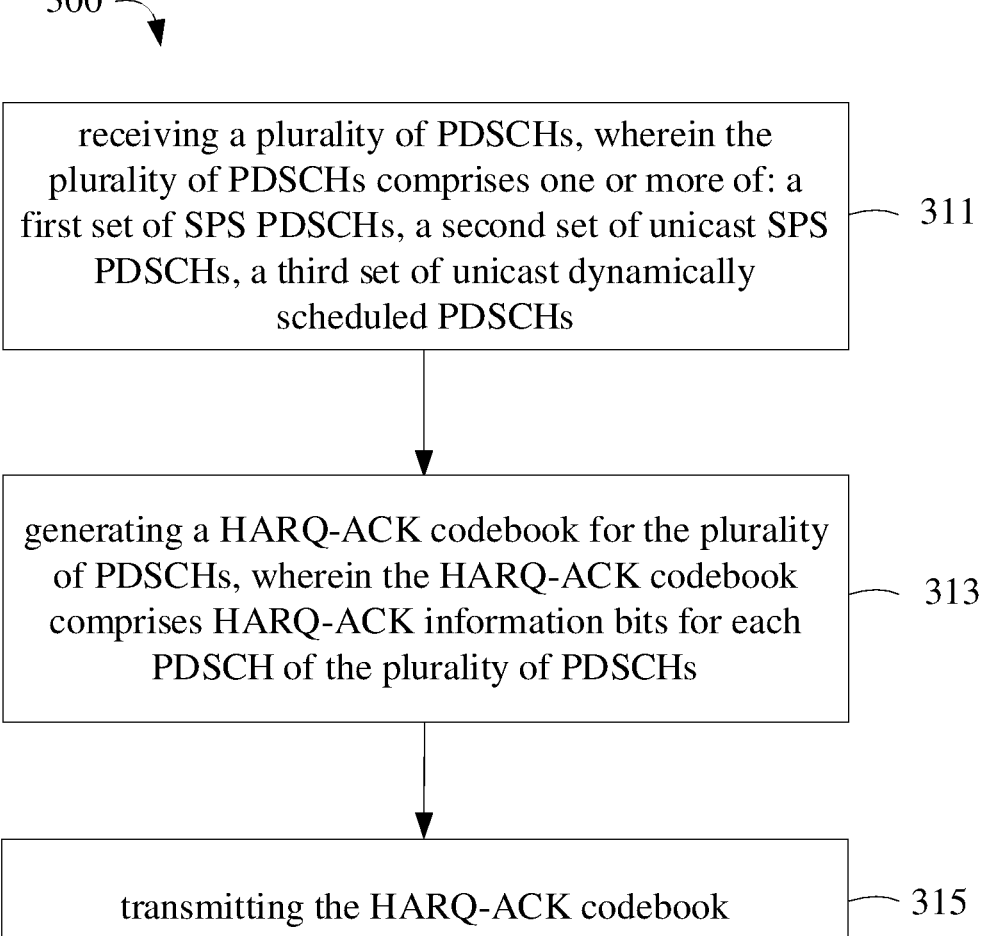

300 receiving a plurality of PDSCHs, wherein the plurality of PDSCHs comprises one or more of: a first set of SPS PDSCHs, a second set of unicast SPS PDSCHs, a third set of unicast dynamically scheduled PDSCHs — 311 generating a HARQ-ACK codebook for the plurality of PDSCHs, wherein the HARQ-ACK codebook comprises HARQ-ACK information bits for each PDSCH of the plurality of PDSCHs — 313 transmitting the HARQ-ACK codebook — 315

FIG. 3

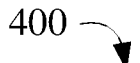
400
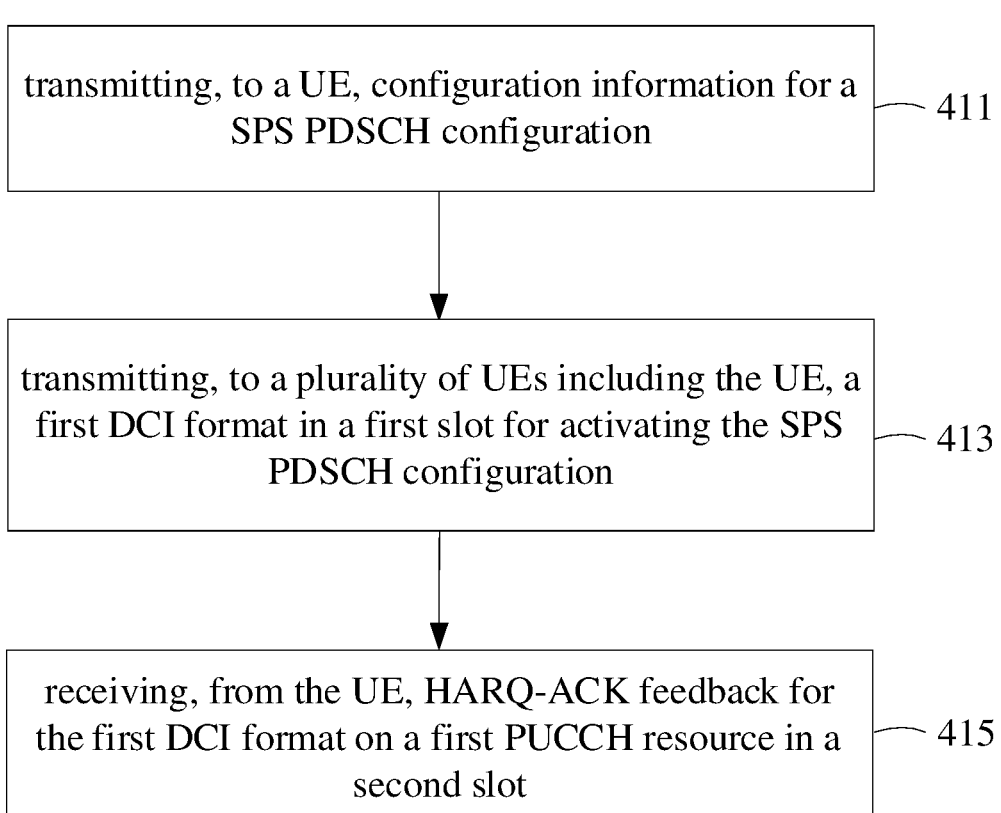
transmitting, to a UE, configuration information for a SPS PDSCH configuration — 411
transmitting, to a plurality of UEs including the UE, a first DCI format in a first slot for activating the SPS PDSCH configuration — 413
receiving, from the UE, HARQ-ACK feedback for the first DCI format on a first PUCCH resource in a second slot — 415
FIG. 4

500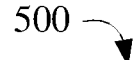

transmitting, to a UE, a plurality of PDSCHs, wherein the plurality of PDSCHs comprises one or more of: a first set of multicast SPS PDSCHs, a second set of unicast SPS PDSCHs, a third set of unicast dynamically scheduled PDSCHs, wherein the first set of multicast SPS PDSCHs is transmitted to a plurality of UEs including the UE

— 511 receiving a HARQ-ACK codebook for the plurality of PDSCHs, wherein the HARQ-ACK codebook comprises HARQ-ACK information bits for each PDSCH of the plurality of PDSCHs

METHOD AND APPARATUS FOR HARQ-ACK FEEDBACK FOR SEMI-PERSISTENT SCHEDULING TRANSMISSION

TECHNICAL FIELD

Embodiments of the present disclosure generally relate to wireless communication technology, and more particularly to hybrid automatic repeat request acknowledgement (HARQ-ACK) feedback transmission.

BACKGROUND

Wireless communication systems are widely deployed to provide various telecommunication services, such as telephony, video, data, messaging, broadcasts, and so on. Wireless communication systems may employ multiple access technologies capable of supporting communication with multiple users by sharing available system resources (e.g., time, frequency, and power). Examples of wireless communication systems may include fourth generation (4G) systems, such as long term evolution (LTE) systems, LTE-advanced (LTE-A) systems, or LTE-A Pro systems, and fifth generation (5G) systems which may also be referred to as new radio (NR) systems.

A wireless communication system may support multicast and broadcast services (MBSs). One or more user equipment (UE) may be grouped as an MBS group and may receive multicast transmissions from a base station (BS) via a physical downlink shared channel (PDSCH). The PDSCH may be a dynamic PDSCH scheduled by downlink control information (DCI) via a corresponding physical downlink control channel (PDCCH) or a semi-persistent scheduling (SPS) PDSCH.

The one or more UEs may transmit hybrid automatic repeat request acknowledgement (HARQ-ACK) feedback corresponding to the PDSCH transmission through a physical uplink control channel (PUCCH) or a physical uplink shared channel (PUSCH).

There is a need for handling HARQ-ACK feedback for multicast transmissions in a wireless communication system.

SUMMARY

Some embodiments of the present disclosure provide a method for wireless communication performed by a user equipment (UE). The method may include: receiving configuration information for a semi-persistent scheduling (SPS) physical downlink shared channel (PDSCH) configuration; receiving, in a first slot, a first downlink control information (DCI) format for activating the SPS PDSCH configuration, wherein the first DCI format is received by a plurality of UEs including the UE; determining, based on the configuration information, a first physical uplink control channel (PUCCH) resource and a second slot for transmitting hybrid automatic repeat request acknowledgement (HARQ-ACK) feedback for the first DCI format; and transmitting, in the second slot, the HARQ-ACK feedback for the first DCI format on the first PUCCH resource.

Some embodiments of the present disclosure provide a method for wireless communication performed by a user equipment (UE). The method may include: receiving a plurality of physical downlink shared channels (PDSCHs), wherein the plurality of PDSCHs comprises one or more of: a first set of multicast semi-persistent scheduling (SPS)

PDSCHs, a second set of unicast SPS PDSCHs, a third set of unicast dynamically scheduled PDSCHs; generating a hybrid automatic repeat request acknowledgement (HARQ-ACK) codebook for the plurality of PDSCHs, wherein the HARQ-ACK codebook comprises HARQ-ACK information bits for each PDSCH of the plurality of PDSCHs; and transmitting the HARQ-ACK codebook.

Some embodiments of the present disclosure provide a method for wireless communication performed by a base station (BS). The method may include: transmitting, to a user equipment (UE), configuration information for a semi-persistent scheduling (SPS) physical downlink shared channel (PDSCH) configuration; transmitting, to a plurality of UEs including the UE, a first downlink control information (DCI) format in a first slot for activating the SPS PDSCH configuration; and receiving, from the UE, hybrid automatic repeat request acknowledgement (HARQ-ACK) feedback for the first DCI format on a first physical uplink control channel (PUCCH) resource in a second slot.

Some embodiments of the present disclosure provide a method for wireless communication performed by a base station (BS). The method may include: transmitting, to a user equipment (UE), a plurality of physical downlink shared channels (PDSCHs), wherein the plurality of PDSCHs comprises one or more of: a first set of multicast semi-persistent scheduling (SPS) PDSCHs, a second set of unicast SPS PDSCHs, a third set of unicast dynamically scheduled PDSCHs, wherein the first set of multicast SPS PDSCHs is transmitted to a plurality of UEs including the UE; and receiving a hybrid automatic repeat request acknowledgement (HARQ-ACK) codebook for the plurality of PDSCHs, wherein the HARQ-ACK codebook comprises HARQ-ACK information bits for each PDSCH of the plurality of PDSCHs.

Some embodiments of the present disclosure provide an apparatus. According to some embodiments of the present disclosure, the apparatus may include: at least one non-transitory computer-readable medium having stored thereon computer-executable instructions; at least one receiving circuitry; at least one transmitting circuitry; and at least one processor coupled to the at least one non-transitory computer-readable medium, the at least one receiving circuitry and the at least one transmitting circuitry, wherein the at least one non-transitory computer-readable medium and the computer executable instructions may be configured to, with the at least one processor, cause the apparatus to perform a method according to some embodiments of the present disclosure.

BRIEF DESCRIPTION OF THE DRAWINGS

In order to describe the manner in which the advantages and features of the disclosure can be obtained, a description of the disclosure is rendered by reference to specific embodiments thereof, which are illustrated in the appended drawings. These drawings depict only exemplary embodiments of the disclosure and are not therefore to be considered limiting of its scope.

FIG. 2 illustrates a flow chart of an exemplary procedure of wireless communications in accordance with some embodiments of the present disclosure;

FIG. 3 illustrates a flow chart of an exemplary procedure of wireless communications in accordance with some embodiments of the present disclosure;

FIG. 4 illustrates a flow chart of an exemplary procedure of wireless communications in accordance with some embodiments of the present disclosure;

FIG. 5 illustrates a flow chart of an exemplary procedure of wireless communications in accordance with some embodiments of the present disclosure.

DETAILED DESCRIPTION

The detailed description of the appended drawings is intended as a description of the preferred embodiments of the present disclosure and is not intended to represent the only form in which the present disclosure may be practiced. It should be understood that the same or equivalent functions may be accomplished by different embodiments that are intended to be encompassed within the spirit and scope of the present disclosure.

Reference will now be made in detail to some embodiments of the present disclosure, examples of which are illustrated in the accompanying drawings. To facilitate understanding, embodiments are provided under specific network architecture and new service scenarios, such as the 3rd generation partnership project (3GPP) 5G (NR), 3GPP long-term evolution (LTE) Release 8, and so on. It is contemplated that along with the developments of network architectures and new service scenarios, all embodiments in the present disclosure are also applicable to similar technical problems; and moreover, the terminologies recited in the present disclosure may change, which should not affect the principles of the present disclosure.

Figure 1:
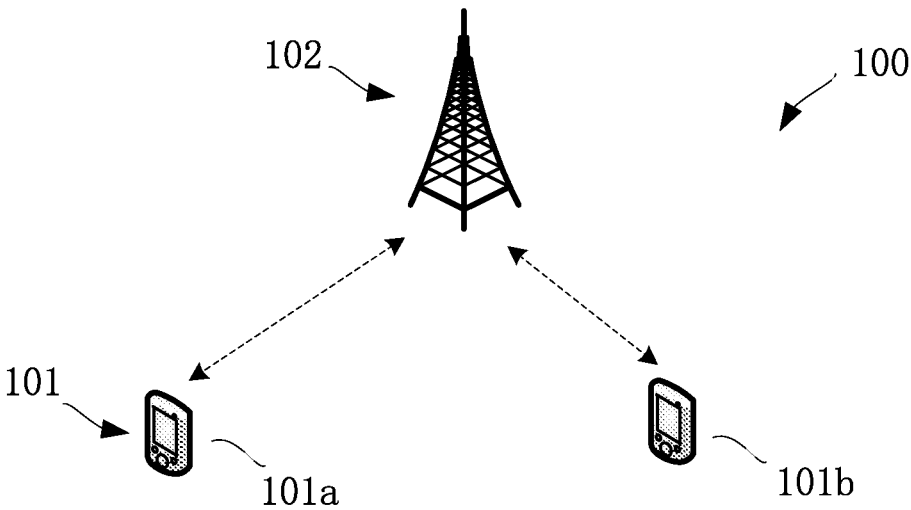
FIG. 1 illustrates a schematic diagram of a wireless communication system in accordance with some embodiments of the present disclosure.

FIG. 1 illustrates a schematic diagram of a wireless communication system 100 in accordance with some embodiments of the present disclosure.

As shown in FIG. 1, a wireless communication system 100 may include some UEs 101 (e.g., UE 101*a* and UE 101*b*) and a base station (e.g., BS 102). Although a specific number of UEs 101 and BS 102 are depicted in FIG. 1, it is contemplated that any number of UEs and BSs may be included in the wireless communication system 100.

The UE(s) 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to some embodiments of the present disclosure, the UE(s) 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments of the present disclosure, the UE(s) 101 includes wearable devices, such as smart watches, fitness bands, optical head-mounted displays, or the like. Moreover, the UE(s) 101 may be referred to as a subscriber unit, a mobile, a mobile station, a user, a terminal, a mobile terminal, a wireless terminal, a fixed terminal, a subscriber station, a user terminal, or a device, or described using other terminology used in the art. The UE(s) 101 may communicate with the BS 102 via uplink (UL) communication signals.

The BS 102 may be distributed over a geographic region. In certain embodiments of the present disclosure, the BS 102 may also be referred to as an access point, an access terminal, a base, a base unit, a macro cell, a Node-B, an evolved Node B (eNB), a gNB, a Home Node-B, a relay node, or a device, or described using other terminology used in the art. The BS 102 is generally a part of a radio access network that may include one or more controllers communicably coupled to one or more corresponding BSs 102. The BS 102 may communicate with UE(s) 101 via downlink (DL) communication signals.

The wireless communication system 100 may be compatible with any type of network that is capable of sending and receiving wireless communication signals. For example, the wireless communication system 100 is compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G network, a satellite communications network, a high altitude platform network, and/or other communications networks.

In some embodiments of the present disclosure, the wireless communication system 100 is compatible with 5G NR of the 3GPP protocol. For example, BS 102 may transmit data using an orthogonal frequency division multiple (OFDM) modulation scheme on the DL and the UE(s) 101 may transmit data on the UL using a discrete Fourier transform-spread-orthogonal frequency division multiplexing (DFT-S-OFDM) or cyclic prefix-OFDM (CP-OFDM) scheme. More generally, however, the wireless communication system 100 may implement some other open or proprietary communication protocols, for example, WiMAX, among other protocols.

In some embodiments of the present disclosure, the BS 102 and UE(s) 101 may communicate using other communication protocols, such as the IEEE 802.11 family of wireless communication protocols. Further, in some embodiments of the present disclosure, the BS 102 and UE(s) 101 may communicate over licensed spectrums, whereas in some other embodiments, the BS 102 and UE(s) 101 may communicate over unlicensed spectrums. The present disclosure is not intended to be limited to the implementation of any particular wireless communication system architecture or protocol.

In some embodiments of the present disclosure, the wireless communication system 100 may support multicast and broadcast services (MBSs). For example, one or more UEs (e.g., UE 101*a* and UE 101*b*) may be grouped as an MBS group to receive MBSs (e.g., an MBS PDSCH) from a BS (e.g., BS 102). Several transmission schemes including, but not limited to, the following three transmission schemes may be applied for multicast transmission: a point-to-point (PTP) transmission scheme, point-to-multipoint (PTM) transmission scheme 1, and PTM transmission scheme 2.

In some embodiments of the present disclosure, under the PTP transmission scheme, RRC_CONNECTED UEs may use a UE-specific PDCCH with a cyclic redundancy check (CRC) scrambled by a UE-specific radio network temporary identifier (RNTI) (e.g., cell-RNTI (C-RNTI)) to schedule a UE-specific PDSCH which is scrambled by the same UE-specific RNTI.

In some embodiments of the present disclosure, under PTM transmission scheme 1, RRC_CONNECTED UEs in the same MBS group may use a group-common PDCCH with a cyclic redundancy check (CRC) scrambled by a group-common radio network temporary identifier (RNTI) to schedule a group-common PDSCH which is scrambled by the same group-common RNTI. This scheme may also be referred to as a group-common PDCCH based group scheduling scheme. The group-common RNTI may be configured via RRC signaling.

In some embodiments of the present disclosure, under PTM transmission scheme 2, RRC_CONNECTED UEs in the same MBS group may use a UE-specific PDCCH with a CRC scrambled by a UE-specific RNTI (e.g., cell-RNTI) to schedule a group-common PDSCH which is scrambled by a group-common RNTI. This scheme may also be referred to as a UE-specific PDCCH based group scheduling scheme.

The "group-common PDCCH/PDSCH" may mean that the PDCCH or PDSCH is transmitted at a common time and/or on frequency resources, and can be identified by all the UEs in the same MBS group. The "UE-specific PDCCH/ PDSCH" may mean that the PDCCH or PDSCH can only be identified by the target UE, but cannot be identified by other UEs.

A UE receiving a downlink multicast transmission may transmit HARQ-ACK feedback corresponding to the downlink multicast transmission to the BS through, for example, a physical uplink control channel (PUCCH). The HARQ-ACK feedback corresponding to a downlink multicast transmission is essential for multicast services in order to satisfy a quality of service (QoS) requirement, such as reliability. In some embodiments of the present disclosure, a group-common RNTI (e.g., group-RNTI (G-RNTI)) is introduced for an MBS so that a UE can differentiate a downlink control information (DCI) format scheduling an MBS PDSCH from a DCI format scheduling a unicast PDSCH. For example, the CRC of the DCI format scheduling an MBS PDSCH may be scrambled by the G-RNTI and the scheduled group-common PDSCH carrying the MBS may also be scrambled by the G-RNTI.

A unicast PDSCH may be a dynamic PDSCH or a semi-persistent scheduling (SPS) PDSCH. In dynamic scheduling, a BS may transmit, to a UE, a DCI format scheduling a PDSCH. In SPS, a BS may configure an SPS PDSCH configuration for a UE through, for example, higher layer signaling (e.g., radio resource control (RRC) signaling). The BS can transmit a DCI format (also referred to as "activation DCI") to activate an SPS PDSCH configuration. The SPS PDSCH transmission may occur at predetermined time instances and with predetermined parameters, as configured by the higher layer signaling, the activation DCI or a combination thereof. The BS may transmit another DCI format (also referred to as "deactivation DCI") to deactivate or release the SPS PDSCH configuration.

In some embodiments of the present disclosure, one or more SPS PDSCH configurations may be configured for a UE. An activation DCI and a deactivation DCI may be used to activate and deactivate an associated SPS PDSCH configuration, respectively. In some embodiments of the present disclosure, when the following conditions are satisfied, a UE may validate whether a DL SPS assignment PDCCH (e.g., a DCI format) is for SPS activation or SPS release:

the CRC of the DCI format is scrambled with a configured scheduling radio network temporary identifier (CS-RNTI) provided by a higher layer parameter, e.g., cs-RNTI;

the new data indicator field in the DCI format for the enabled transport block is set to '0'; and the downlink feedback information (DFI) flag field, if present, in the DCI format is set to '0'.

In some embodiments of the present disclosure, when the validation is for scheduling activation and when the PDSCH-to-HARQ_feedback timing indicator field in the DCI format is present, the PDSCH-to-HARQ_feedback timing indicator field does not provide an inapplicable value from a higher layer parameter, e.g., dl-DataToUL-ACK-r16.

In some embodiments of the present disclosure, validation of an activation DCI format may be achieved when the RV field of the DCI format is set according to Table 1 below. It should be understood that Table 1 is only for illustrative purposes, and should not be construed as limiting the embodiments of the present disclosure.

TABLE 1

Special fields for a single DL SPS or single UL grant Type
2 scheduling activation PDCCH validation when a UE is provided
multiple DL SPS or UL grant Type 2 configurations in the
active DL/UL bandwidth part (BWP) of the scheduled cell

| | DCI format 0_0/0_1/0_2 | DCI format 1_0/1_2 | DCI format 1_1 |
|---|---|---|---|
| Redundancy version | set to all '0's | set to all '0's | For the enabled transport block: set to all '0's |

Furthermore, when a UE is configured with more than one SPS PDSCH configuration, a value of a HARQ process number field in an activation DCI format may indicate an activation for a corresponding SPS PDSCH configuration with the same value as provided by a higher layer parameter, e.g., sps-ConfigIndex.

In some embodiments of the present disclosure, validation of a deactivation DCI format may be achieved when fields for the DCI format are set according to Table 2 below. It should be understood that Table 2 is only for illustrative purposes, and should not be construed as limiting the embodiments of the present disclosure.

TABLE 2

Special fields for a single or multiple DL SPS and UL grant
Type 2 scheduling release PDCCH validation when a UE is
provided multiple DL SPS or UL grant Type 2 configurations
in the active DL/UL BWP of the scheduled cell

| | DCI format 0_0/0_1/0_2 | DCI format 1_0/1_1/1_2 |
|---|---|---|
| Redundancy version | set to all '0's | set to all '0's |
| Modulation and coding scheme | set to all '1's | set to all '1's |
| Frequency domain resource assignment | set to all '0's for FDRA Type 2 with μ = 1; set to all '1's, otherwise | set to all '0's for FDRA Type 0 or for dynamicSwitch; set to all '1's for FDRA Type 1 |

Furthermore, when a UE is configured with more than one SPS PDSCH configuration, the release of a specific SPS PDSCH configuration may be performed according to the following manner:

when the UE is provided with a list indicated by a higher layer parameter, e.g., sps-ConfigDeactivationStateList, a value of the HARQ process number field in a deactivation DCI format may indicate a corresponding entry for scheduling release of one or more SPS PDSCH configurations; and when the UE is not provided with the list, e.g., sps-ConfigDeactivationStateList, a value of the HARQ process number field in a deactivation DCI format may indicate a release for a corresponding SPS PDSCH configuration with the same value as provided by a higher layer parameter, e.g., sps-ConfigIndex.

Similarly to the unicast PDSCH, a multicast PDSCH may be a dynamic PDSCH or an SPS PDSCH. A BS may configure an SPS group-common PDSCH configuration for a group of UEs receiving multicast. In some embodiments of the present disclosure, for RRC_CONNECTED UEs, more than one SPS group-common PDSCH configuration for an MBS can be configured per UE subject to UE capability. In some embodiments of the present disclosure, the total number of SPS PDSCH configurations supported by a UE defined for unicast may not be increased even with the additional support of the MBS. In some embodiments of the present disclosure, a group-common PDCCH may be used for the activation or deactivation of an SPS group-common PDSCH configuration.

When one or multiple SPS PDSCH configurations are provided to a UE for multicast of an MBS service, the above descriptions regarding the validation of the PDCCH and the activation and deactivation of PDSCH configurations can be similarly applied. However, there are some issues related to the multicast transmission which need to be solved.

For example, in some cases, a discontinuous transmission (DTX) may occur. For example, since the activation DCI may be transmitted to a group of UEs to activate an SPS configuration for an MBS, the BS may not know which UE has successfully received the activation DCI and which UE has missed the activation DCI. For those UEs which missed the activation DCI, they cannot receive subsequent multicast SPS PDSCHs.

Moreover, problems may also exist in HARQ-ACK feedback transmissions of the PDSCHs, e.g., HARQ-ACK feedback multiplexing. In some examples, when the HARQ-ACK feedback for a plurality of multicast SPS PDSCHs is to be transmitted in the same slot, a problem is how to construct the HARQ-ACK codebook since the SPS PDSCHs are not scheduled by DCI formats. Therefore, solutions for HARQ-ACK feedback multiplexing of a plurality of multicast SPS PDSCHs are needed. In some examples, when HARQ-ACK feedback for a multicast SPS PDSCH(s) is to be transmitted with HARQ-ACK feedback for a unicast dynamically scheduled PDSCH(s), there is the problem of how to construct the HARQ-ACK codebook since the SPS PDSCH(s) is not scheduled by a DCI format(s). Therefore, solutions for HARQ-ACK feedback multiplexing of a multicast SPS PDSCH(s) and a unicast dynamically scheduled PDSCH(s) are needed. In some examples, when HARQ-ACK feedback for a multicast SPS PDSCH(s) is to be transmitted with HARQ-ACK feedback for a unicast SPS PDSCH(s), there is the problem of how to construct the HARQ-ACK codebook since the SPS PDSCH are not scheduled by DCI formats. Therefore, solutions for HARQ-ACK feedback multiplexing of a multicast SPS PDSCH(s) and a unicast SPS PDSCH(s) are needed.

Embodiments of the present disclosure provide solutions to solve the above issues. More details on the embodiments of the present disclosure will be illustrated in the following text in combination with the appended drawings. Although the above issues and the below solutions are described with respect to a specific network architecture or application scenario (e.g., MBS), it should be appreciated by persons skilled in the art that the above issues may exist in other specific network architectures or application scenarios, and the solutions can still solve the above issues.

In some embodiments of the present disclosure, for the activation of a group-common SPS PDSCH configuration for an MBS for a group of UEs, a UE-specific PUCCH resource may be configured by, for example, RRC signaling, to each UE in the group. Moreover, ACK-only based HARQ-ACK feedback may be employed by each UE in the group to confirm the reception of the activation DCI. For example, in response to the reception of the activation DCI, a UE in the group of UEs (member UE) may transmit an ACK on the configured UE-specific PUCCH resource. Otherwise, if a member UE does not receive any activation DCI, the UE may transmit nothing on the configured UE-specific PUCCH resource.

From the BS's perspective, in response to the reception of an ACK on the configured PUCCH resource from a UE, the BS would know that the UE has successfully received the activation DCI. Otherwise, if a UE does not transmit any HARQ-ACK feedback, the BS would determine that this UE has not received the activation DCI, and will retransmit the activation DCI.

In some embodiments of the present disclosure, the activation DCI may be transmitted via a PTM transmission scheme in the initial transmission and may be retransmitted via a PTP transmission scheme in the subsequent retransmission (if any). For example, the CRC of the initial activation DCI may be scrambled by a group-common RNTI, e.g., G-RNTI; and the CRC of the retransmitted activation DCI may be scrambled by a UE-specific RNTI, e.g., C-RNTI.

In some embodiments of the present disclosure, the activation DCI may be transmitted via a PTM transmission scheme in the initial transmission and may be retransmitted via a PTM transmission scheme in the subsequent retransmission (if any). For example, the CRCs of the initial activation DCI and the retransmitted activation DCI may be scrambled by the same group-common RNTI, e.g., G-RNTI. In these embodiments, UEs which have successfully received the (initial) activation DCI and reported an ACK on the respective PUCCH resources may also receive the retransmitted activation DCI for the same group-common SPS PDSCH configuration. In response to the retransmitted activation DCI, these UEs can transmit an ACK again or nothing on the respective PUCCH resources.

Various methods may be employed by the member UEs and the BS to determine or configure the HARQ-ACK feedback timing for transmitting the ACK-only based feedback in response to the activation DCI.

For example, in some embodiments of the present disclosure, the BS may transmit RRC signaling to a member UE to configure a HARQ-ACK feedback timing value for transmitting the ACK-only based feedback in response to the activation DCI. In some examples, the RRC signaling may be the one configures the SPS PDSCH configuration and the UE-specific PUCCH resource. Assuming that the HARQ-ACK feedback timing value equals k1, when a UE receives the activation DCI in slot n, the UE will transmit an ACK on the configured UE-specific PUCCH resource in slot n+k1. That is, the HARQ-ACK feedback timing value may indicate an offset between the slot where the activation DCI is received and the slot where the corresponding HARQ-ACK feedback (e.g., ACK) for the activation DCI is transmitted.

In some other embodiments of the present disclosure, an indicator (hereinafter, "activation DCI HARQ-ACK feedback timing indicator") in the activation DCI may indicate the HARQ-ACK feedback timing value. For example, a set of HARQ-ACK timing values may be configured to a member UE via RRC signaling, or may be predefined, for example, in a standard(s). The activation DCI HARQ-ACK feedback timing indicator may indicate the HARQ-ACK timing value from the set of HARQ-ACK timing values.

For instance, in some cases, a set of HARQ-ACK timing values, for example, 11, 2, 3, 4, 5, 6, 7, 81, may be predefined in a standard(s). In some cases, the BS may configure a set of HARQ-ACK timing values, which may include several values (e.g., 8) selected from, for example, {1-16}, to a member UE via RRC signaling. The RRC signaling may be the one configures the SPS PDSCH configuration and the UE-specific PUCCH resource. The activation DCI HARQ-ACK feedback timing indicator may indicate a specific HARQ-ACK timing value from the predefined or configured set of HARQ-ACK timing values. For example, the activation DCI HARQ-ACK feedback timing indicator may be an index to the set of HARQ-ACK timing values.

Since the PDSCH-to-HARQ_timing indicator in the activation DCI is used to indicate the HARQ-ACK feedback timing between an SPS PDSCH and the PUCCH carrying the HARQ-ACK feedback for the SPS PDSCH, the PDSCH-to-HARQ_timing indicator in the activation DCI may not be used to indicate the activation DCI HARQ-ACK feedback timing indicator.

In some examples, the field of the PUCCH resource indicator in the activation DCI may indicate the activation DCI HARQ-ACK feedback timing indicator. In other words, the PUCCH resource indicator may be reinterpreted as the activation DCI HARQ-ACK feedback timing indicator. In this way, for transmitting the ACK in response to the activation DCI, the corresponding UE-specific PUCCH resource is indicated by RRC signaling and the corresponding HARQ-ACK feedback timing can be derived from the field of the PUCCH resource indicator in the activation DCI. In some other examples, the corresponding HARQ-ACK feedback timing for confirming the reception of the activation DCI may be indicated by other fields (e.g., transmit power control (TPC) field) in the activation DCI.

In some embodiments of the present disclosure, for the deactivation of a group-common SPS PDSCH configuration for an MBS for a group of UEs, a deactivation DCI (also called a "DL SPS release DCI") may be transmitted to the group of UEs. Moreover, ACK-only based HARQ-ACK feedback may be employed by each UE in the group to confirm the reception of the deactivation DCI. In some embodiments of the present disclosure, for each member UE, the same UE-specific PUCCH resource may be used to confirm the receptions of the activation DCI and the deactivation DCI for the same group-common SPS PDSCH configuration. For example, when a BS configures a group-common SPS PDSCH configuration to a group of UEs, for each UE in the group, the BS may configure a single PUCCH resource for the corresponding UE to transmit an ACK for confirming the reception of the activation DCI for activating the group-common SPS PDSCH configuration and for confirming the reception of the deactivation DCI for deactivating the same group-common SPS PDSCH configuration.

From the UE's perspective, in response to the reception of either an activation DCI or a deactivation DCI, a UE may transmit an ACK on the configured PUCCH resource. Otherwise, if a UE does not receive any activation DCI or any deactivation DCI, the UE may transmit nothing on the configured PUCCH resource. In this way, a single PUCCH resource would be adequate for indicating the ACK for the activation DCI and the deactivation DCI since the two DCIs would not occur in the same slot.

From the BS's perspective, in response to the reception of an ACK on the configured PUCCH resource from a UE, the BS would know that the UE has successfully received the deactivation DCI. Otherwise, if a UE does not transmit any HARQ-ACK feedback, the BS would determine that this UE has not received the deactivation DCI, and will retransmit the deactivation DCI.

In some embodiments of the present disclosure, the deactivation DCI may be transmitted via a PTM transmission scheme in the initial transmission and may be retransmitted via a PTP transmission scheme in the subsequent retransmission (if any). For example, the CRC of the initial deactivation DCI may be scrambled by a group-common RNTI, e.g., G-RNTI; and the CRC of the retransmitted deactivation DCI may be scrambled by a UE-specific RNTI, e.g., C-RNTI.

In some embodiments of the present disclosure, the deactivation DCI may be transmitted via a PTM transmission scheme in the initial transmission and may be retransmitted via a PTM transmission scheme in the subsequent retransmission (if any). For example, the CRCs of the initial deactivation DCI and the retransmitted deactivation DCI may be scrambled by the same group-common RNTI, e.g., G-RNTI. In these embodiments, UEs which have successfully received the (initial) deactivation DCI and reported an ACK on the respective PUCCH resources may also receive the retransmitted deactivation DCI for the same group-common SPS PDSCH configuration. In response to the retransmitted deactivation DCI, these UEs can transmit an ACK again or nothing on the respective PUCCH resources.

Various methods may be employed by the member UEs and the BS to determine or configure the HARQ-ACK feedback timing for transmitting the ACK-only based feedback in response to the deactivation DCI.

For example, in some embodiments of the present disclosure, the BS may transmit RRC signaling to a member UE to configure a HARQ-ACK feedback timing value for transmitting the ACK-only based feedback in response to the deactivation DCI. In some examples, the RRC signaling may be the one configures the SPS PDSCH configuration and the UE-specific PUCCH resource. Assuming that the configured HARQ-ACK feedback timing value equals k2, when a UE receives the deactivation DCI in slot m, the UE will transmit an ACK on the configured UE-specific PUCCH resource in slot m+k2. That is, the HARQ-ACK feedback timing value may indicate an offset between the slot where the deactivation DCI is received and the slot where the corresponding HARQ-ACK feedback (e.g., ACK) for the deactivation DCI is transmitted.

In some other embodiments of the present disclosure, an indicator (hereinafter, "deactivation DCI HARQ-ACK feedback timing indicator") in the deactivation DCI may indicate the HARQ-ACK feedback timing value. For example, a set of HARQ-ACK timing values may be configured to a member UE via RRC signaling, or may be predefined, for example, in a standard(s). The deactivation DCI HARQ-ACK feedback timing indicator may indicate the HARQ-ACK timing value from the set of HARQ-ACK timing values.

For instance, in some cases, a set of HARQ-ACK timing values, for example, {1, 2, 3, 4, 5, 6, 7, 8}, may be predefined in a standard(s). In some cases, the BS may configure a set of HARQ-ACK timing values, which may include several values (e.g., 8) selected from, for example, {1-16}, to a member UE via RRC signaling. The RRC signaling may be the one configures the SPS PDSCH configuration and the UE-specific PUCCH resource. The deactivation DCI HARQ-ACK feedback timing indicator may indicate a specific HARQ-ACK timing value from the predefined or configured set of HARQ-ACK timing values.

For example, the deactivation DCI HARQ-ACK feedback timing indicator may be an index to the set of HARQ-ACK timing values.

In some examples, the field of the PUCCH resource indicator in the deactivation DCI may indicate the deactivation DCI HARQ-ACK feedback timing indicator. In other words, the PUCCH resource indicator may be reinterpreted as the deactivation DCI HARQ-ACK feedback timing indicator. In this way, for transmitting the ACK in response to the deactivation DCI, the corresponding UE-specific PUCCH resource is indicated by RRC signaling and the corresponding HARQ-ACK feedback timing can be derived from the field of the PUCCH resource indicator in the deactivation DCI.

In some other examples, the PDSCH-to-HARQ_timing indicator in the deactivation DCI may indicate the deactivation DCI HARQ-ACK feedback timing indicator. In other words, the PDSCH-to-HARQ_timing indicator may be reinterpreted as the deactivation DCI HARQ-ACK feedback timing indicator.

In yet other examples, the HARQ-ACK feedback timing for confirming the reception of the deactivation DCI may be indicated by other fields (e.g., TPC field) in the deactivation DCI.

After a group-common SPS PDSCH configuration is activated, a group-common SPS PDSCH (also referred to as "multicast SPS PDSCH") may be transmitted to the group of UEs. Various methods may be employed to transmit the HARQ-ACK feedback for the SPS PDSCH.

For example, in some embodiments of the present disclosure, ACK-only based HARQ-ACK feedback may be employed. That is, in response to the group-common SPS PDSCH being successfully received by a UE, the UE may transmit an ACK for the SPS PDSCH. Otherwise, in response to the SPS PDSCH not being successfully received by the UE, the UE may transmit nothing.

For each UE in the group of UEs, a single UE-specific PUCCH resource may be used to transmit an ACK not only for the activation DCI and the deactivation DCI, but also for the received group-common SPS PDSCH with the same group-common SPS PDSCH configuration. For example, when a BS configures a group-common SPS PDSCH configuration to a group of UEs, for each UE in the group, the BS may configure a single PUCCH resource for the corresponding UE to transmit an ACK for confirming the reception of the activation DCI for activating a group-common SPS PDSCH configuration, for confirming the reception of the deactivation DCI for deactivating the same group-common SPS PDSCH configuration, and for indicating the successful reception of the corresponding group-common SPS PDSCH with the same group-common SPS PDSCH configuration.

From the UE's perspective, in response to the reception an activation DCI or a deactivation DCI, or successful reception of a group-common SPS PDSCH, a UE may transmit an ACK on the configured PUCCH resource. Otherwise, if a UE does not receive any activation DCI, any deactivation DCI, or any group-common SPS PDSCH, the UE may transmit nothing on the configured PUCCH resource. In this way, a single PUCCH resource would be adequate for indicating the ACK for the activation DCI, the deactivation DCI, and the SPS PDSCH since the two DCIs and the SPS PDSCH would not occur in the same slot.

From the BS's perspective, in response to the reception of an ACK on the configured PUCCH resource from a UE, the BS would know that the UE has successfully received the SPS PDSCH. Otherwise, if a UE does not transmit any HARQ-ACK feedback for the SPS PDSCH, the BS would determine that this UE has not received the SPS PDSCH, and will retransmit the SPS PDSCH.

In some embodiments of the present disclosure, the group-common SPS PDSCH may be transmitted via a PTM transmission scheme in the initial transmission and may be retransmitted via a PTP transmission scheme in the subsequent retransmission (if any). For example, the retransmitted group-common SPS PDSCH may be scheduled by a DCI format with a CRC scrambled by a UE-specific RNTI, e.g., C-RNTI. Moreover, the HARQ process number of the DCI format may indicate the same HARQ process as the initial group-common SPS PDSCH and the new data indicator (NDI) of the DCI format may be set as "1."

In some embodiments of the present disclosure, the group-common SPS PDSCH may be transmitted via a PTM transmission scheme in the initial transmission and may be retransmitted via a PTM transmission scheme in the subsequent retransmission (if any). In these embodiments, UEs which have successfully received the (initial) group-common SPS PDSCH and reported an ACK on the respective PUCCH resources may also receive the retransmitted group-common SPS PDSCH. In response to the retransmitted group-common SPS PDSCH, these UEs can transmit an ACK again or nothing on the respective PUCCH resources.

In some embodiments of the present disclosure, NACK-only based HARQ-ACK feedback may be employed. That is, in response to the group-common SPS PDSCH not being successfully received by a UE, the UE may transmit a NACK for the SPS PDSCH. Otherwise, in response to the SPS PDSCH being successfully received by the UE, the UE may transmit nothing.

For each UE in the group of UEs, a single UE-specific PUCCH resource may be used to transmit an ACK for the activation DCI and the deactivation DCI, and to transmit a NACK for the group-common SPS PDSCH with the same group-common SPS PDSCH configuration. For example, when a BS configures a group-common SPS PDSCH configuration to a group of UEs, for each UE in the group, the BS may configure a single PUCCH resource for the corresponding UE to transmit an ACK for confirming the reception of an activation DCI for activating a group-common SPS PDSCH configuration and for confirming the reception of a deactivation DCI for deactivating the same group-common SPS PDSCH configuration, and to transmit a NACK for indicating the failed reception of the corresponding group-common SPS PDSCH with the same group-common SPS PDSCH configuration.

From the UE's perspective, in response to the reception an activation DCI or a deactivation DCI, a UE may transmit an ACK on the configured PUCCH resource; in response to a successful reception of a group-common SPS PDSCH, a UE may transmit nothing on the configured PUCCH resource; and in response to a failed reception of a group-common SPS PDSCH, a UE may transmit a NACK on the configured PUCCH resource. In this way, a single PUCCH resource would be adequate for indicating the ACK for the activation DCI and the deactivation DCI, and the NACK for the SPS PDSCH since the two DCIs and the SPS PDSCH would not occur in the same slot.

From the BS's perspective, in response to the reception of nothing on the configured PUCCH resource from a UE, the BS would know that the UE has successfully received the SPS PDSCH. Otherwise, in response to the reception of a NACK on the configured PUCCH resource from a UE, the BS will retransmit the SPS PDSCH.

In some embodiments of the present disclosure, the group-common SPS PDSCH may be transmitted via a PTM transmission scheme in the initial transmission and may be retransmitted via a PTP transmission scheme in the subsequent retransmission (if any). For example, the retransmitted group-common SPS PDSCH may be scheduled by a DCI format with a CRC scrambled by a UE-specific RNTI, e.g., C-RNTI. Moreover, the HARQ process number of the DCI format may indicate the same HARQ process as the initial group-common SPS PDSCH and the new data indicator (NDI) of the DCI format may be set as "1."

In some embodiments of the present disclosure, the group-common SPS PDSCH may be transmitted via a PTM transmission scheme in the initial transmission and may be retransmitted via a PTM transmission scheme in the subsequent retransmission (if any). In these embodiments, UEs which have not successfully received the (initial) group-common SPS PDSCH and reported a NACK on the respective PUCCH resources may receive the retransmitted group-common SPS PDSCH for further decoding.

In some embodiments of the present disclosure, ACK/NACK based HARQ-ACK feedback may be employed. That is, in response to the group-common SPS PDSCH not being successfully received by a UE, the UE may transmit a NACK for the SPS PDSCH. Otherwise, in response to the SPS PDSCH being successfully received by the UE, the UE may transmit an ACK for the SPS PDSCH.

For each UE in the group of UEs, two PUCCH resources may be configured. In some examples, one of the two PUCCH resources may be used to transmit an ACK not only for the activation DCI and the deactivation DCI, but also for the received group-common SPS PDSCH with the same group-common SPS PDSCH configuration. The other PUCCH resource may be used to transmit a NACK for the group-common SPS PDSCH with the same group-common SPS PDSCH configuration.

For example, when a BS configures a group-common SPS PDSCH configuration to a group of UEs, for each UE in the group, the BS may configure two PUCCH resources. One (e.g., PUCCH resource #A) of the two PUCCH resources is used by the corresponding UE to transmit an ACK for confirming the reception of the activation DCI for activating a group-common SPS PDSCH configuration, for confirming the reception of the deactivation DCI for deactivating the same group-common SPS PDSCH configuration, and for indicating the successful reception of the corresponding group-common SPS PDSCH with the same group-common SPS PDSCH configuration. The other PUCCH resource (e.g., PUCCH resource #B) is used by the corresponding UE to transmit a NACK for indicating the failed reception of the corresponding group-common SPS PDSCH with the same group-common SPS PDSCH configuration.

From the UE's perspective, in response to the reception an activation DCI or a deactivation DCI, or successful reception of a group-common SPS PDSCH, a UE may transmit an ACK on the configured PUCCH resource (e.g., PUCCH resource #A) for ACK transmission. Otherwise, if a UE fails to receive the group-common SPS PDSCH, the UE may transmit a NACK on the configured PUCCH resource (e.g., PUCCH resource #B) for NACK transmission. In this way, two PUCCH resources would be adequate since one is used for indicating the ACK for the activation DCI, the deactivation DCI, and the SPS PDSCH and the other one is used for indicating a NACK for the SPS PDSCH.

The PUCCH resource for the ACK transmission may be UE-specific. That is, different UEs in the group may have different PUCCH resources. The PUCCH resource for the NACK transmission can be either UE-specific or shared by the group of UEs.

From the BS's perspective, in response to the reception of an ACK on the configured PUCCH resource from a UE, the BS would know that the UE has successfully received the SPS PDSCH. Otherwise, in response to the reception of a NACK on the configured PUCCH resource from a UE, the BS will retransmit the SPS PDSCH.

In some embodiments of the present disclosure, the group-common SPS PDSCH may be transmitted via a PTM transmission scheme in the initial transmission and may be retransmitted via a PTP transmission scheme in the subsequent retransmission (if any). For example, the retransmitted group-common SPS PDSCH may be scheduled by a DCI format with a CRC scrambled by a UE-specific RNTI, e.g., C-RNTI. Moreover, the HARQ process number of the DCI format may indicate the same HARQ process as the initial group-common SPS PDSCH and the new data indicator (NDI) of the DCI format may be set as "1."

In some embodiments of the present disclosure, the group-common SPS PDSCH may be transmitted via a PTM transmission scheme in the initial transmission and may be retransmitted via a PTM transmission scheme in the subsequent retransmission (if any). In these embodiments, UEs which have not successfully received the (initial) group-common SPS PDSCH and reported the NACK on the respective PUCCH resources may receive the retransmitted group-common SPS PDSCH for further decoding.

In some other examples, one of the two PUCCH resources may be used to transmit an ACK for the activation DCI and the deactivation DCI, and to transmit a NACK for the group-common SPS PDSCH with the same group-common SPS PDSCH configuration. The other PUCCH resource may be used to transmit an ACK for the group-common SPS PDSCH with the same group-common SPS PDSCH configuration. The above descriptions can be similarly applied and thus are omitted herein.

As stated above, problems may exist in HARQ-ACK feedback multiplexing. Various methods may be employed to solve this issue.

For example, in some cases, a UE may receive a plurality of multicast SPS PDSCHs with the corresponding HARQ-ACK feedback to be transmitted in the same slot. The UE may generate a HARQ-ACK codebook including the HARQ-ACK information bits for the plurality of multicast SPS PDSCHs according to various methods as will be described in details below. In some embodiments, each multicast SPS PDSCH may correspond to a single HARQ-ACK information bit.

In the HARQ-ACK codebook, in the case that the plurality of multicast SPS PDSCHs are associated with the same multicast SPS PDSCH configuration, the HARQ-ACK information bits for the plurality of multicast SPS PDSCHs may be ordered according to the order in the time domain, for example, the respective reception times of the PDSCHs by the UE. For example, the HARQ-ACK information bit for a multicast SPS PDSCH (e.g., PDSCH #A1) may be placed in front of that for another multicast SPS PDSCH (e.g., PDSCH #A2) if PDSCH #A1 is received earlier than PDSCH #A2 by the UE.

In the case the plurality of multicast SPS PDSCHs are associated with different multicast SPS PDSCH configurations, the HARQ-ACK information bits for the plurality of multicast SPS PDSCHs may be ordered according to the respective activation DCI, for example, the values of downlink assignment indicators (DAIs) in the respective activation DCI. For example, the HARQ-ACK information bit for a multicast SPS PDSCH (e.g., PDSCH #B1) may be placed in front of that for another multicast SPS PDSCH (e.g., PDSCH #B2) if the value of the DAI (e.g., counter DAI) in the activation DCI for PDSCH #B1 is smaller than that for PDSCH #B2. Therefore, the DAI (e.g., counter DAI) in the activation DCI for each SPS PDSCH configuration may be used to order the HARQ-ACK information bits when HARQ-ACK information bits for a plurality of PDSCHs with different SPS PDSCH configurations are to be multiplexed in the same HARQ-ACK codebook.

For example, a UE may receive three multicast SPS PDSCHs (e.g., PDSCH #C1, PDSCH #C2, and PDSCH #C3) with the corresponding HARQ-ACK feedback to be transmitted in the same slot. PDSCH #C1 and PDSCH #C2 may be associated with the same multicast SPS PDSCH configuration (configuration #A1) and PDSCH #C3 may be associated with a different multicast SPS PDSCH configuration (configuration #A2). Configuration #A1 and configuration #A2 may be activated by activation DCI format #A1 and activation DCI format #A2, respectively. Assuming that PDSCH #C1 is received earlier than PDSCH #C2 by the UE and the DAI value of DCI format #A1 is smaller than that of DCI format #A2, the UE may generate a HARQ-ACK codebook of {b0, b1, b2}, where b0, b1, and b2 are the HARQ-ACK information bits for PDSCH #C1, PDSCH #C2, and PDSCH #C3, respectively.

The above methods for arranging HARQ-ACK information bits for multicast SPS PDSCHs (e.g., based on the PDSCH reception times, the respective activation DCI or a combination thereof) may also be applied to unicast SPS PDSCHs with HARQ-ACK information bits to be transmitted in the same slot.

In some cases, a UE may receive a multicast SPS PDSCH(s) and a unicast dynamically scheduled PDSCH(s) with the corresponding HARQ-ACK feedback to be transmitted in the same slot.

In some embodiments of the present disclosure, the UE may generate a HARQ-ACK codebook including two sub-codebooks. One of the two sub-codebooks may include the HARQ-ACK information bit(s) for the multicast SPS PDSCH(s) and the other sub-codebook may include the HARQ-ACK information bit(s) for the unicast dynamically scheduled PDSCH(s).

In the sub-codebook for the multicast SPS PDSCHs, the HARQ-ACK information bits may be ordered according to the aforementioned methods (i.e., based on the PDSCH reception times, the respective activation DCI or a combination thereof). In the sub-codebook for the unicast dynamically scheduled PDSCHs, the HARQ-ACK information bits may be ordered according to various known solutions, including, for example, based on the respective DCI formats scheduling the unicast PDSCHs. A rule for determining which sub-codebook is placed in the beginning of the HARQ-ACK codebook may be predefined, for example, in the standard(s). For instance, in some examples, the sub-codebook for the multicast SPS PDSCH(s) may be placed in the beginning of the HARQ-ACK codebook. The sub-codebook for the unicast dynamically scheduled PDSCH(s) may follow the sub-codebook for the multicast SPS PDSCH(s). In some other examples, the sub-codebook for the unicast dynamically scheduled PDSCH(s) may be placed in the beginning of the HARQ-ACK codebook. The sub-codebook for the multicast SPS PDSCH(s) may follow the sub-codebook for the unicast dynamically scheduled PDSCH(s).

In some other embodiments of the present disclosure, the HARQ-ACK information bits for the multicast SPS PDSCH(s) and the unicast dynamically scheduled PDSCH(s) may be ordered according to their respective DCI formats, that is, the activation DCI format(s) for the multicast SPS PDSCH(s) and the DCI format(s) scheduling the unicast dynamically scheduled PDSCH(s). For example, the HARQ-ACK information bit for a multicast SPS PDSCH (e.g., PDSCH #D1) may be placed in front of that for a unicast dynamically scheduled PDSCH (e.g., PDSCH #D2) if the value of the DAI (e.g., counter DAI) in the activation DCI for PDSCH #D1 is smaller than that in the DCI format for scheduling PDSCH #D2.

In some cases, a UE may receive a multicast SPS PDSCH(s) and a unicast SPS PDSCH(s) with the corresponding HARQ-ACK feedback to be transmitted in the same slot.

In some embodiments of the present disclosure, the HARQ-ACK information bits for the multicast SPS PDSCH(s) and the unicast SPS PDSCH(s) may be ordered according to their respective activation DCI formats, for example, the values of DAIs in the respective activation DCI. For example, the HARQ-ACK information bit for a multicast SPS PDSCH (e.g., PDSCH #E1) may be placed in front of that for a unicast SPS PDSCH (e.g., PDSCH #E2) if the value of the DAI (e.g., counter DAI) in the activation DCI for PDSCH #E1 is smaller than that for PDSCH #E2.

In some other embodiments of the present disclosure, the UE may generate a HARQ-ACK codebook including two sub-codebooks. One of the two sub-codebooks may include the HARQ-ACK information bit(s) for the multicast SPS PDSCH(s) and the other sub-codebook may include the HARQ-ACK information bit(s) for the unicast SPS PDSCH(s).

In the sub-codebook for the multicast SPS PDSCHs, the HARQ-ACK information bits may be ordered according to the aforementioned methods (i.e., based on the PDSCH reception times, the respective activation DCI or a combination thereof). In the sub-codebook for the unicast SPS PDSCHs, the HARQ-ACK information bits may be ordered according to the aforementioned methods (i.e., based on the PDSCH reception times, the respective activation DCI or a combination thereof). A rule for determining which sub-codebook is placed in the beginning of the HARQ-ACK codebook may be predefined, for example, in the standard(s). For instance, in some examples, the sub-codebook for the multicast SPS PDSCH(s) may be placed in the beginning of the HARQ-ACK codebook. The sub-codebook for the unicast SPS PDSCH(s) may follow the sub-codebook for the multicast SPS PDSCH(s). In some other examples, the sub-codebook for the unicast SPS PDSCH(s) may be placed in the beginning of the HARQ-ACK codebook. The sub-codebook for the multicast SPS PDSCH(s) may follow the sub-codebook for the unicast SPS PDSCH(s).

Although the above solutions for multiplexing HARQ-ACK feedback are described with respect to several application scenarios, it should be appreciated by persons skilled in the art that any combination of the above solutions may be applied for multiplexing HARQ-ACK feedback in other application scenarios.

FIG. 2 illustrates a flow chart of an exemplary procedure 200 for wireless communications in accordance with some embodiments of the present disclosure. Details described in all of the foregoing embodiments of the present disclosure are applicable for the embodiments shown in FIG. 2. In some examples, the procedure may be performed by a UE, for example, UE 101 in FIG. 1.

Referring to FIG. 2, in operation 211, a UE may receive configuration information for an SPS PDSCH configuration. In operation 213, the UE may receive, in a first slot, a first DCI format for activating the SPS PDSCH configuration. The first DCI format may be received by a plurality of UEs including the UE. In operation 215, the UE may determine, based on the configuration information, a first PUCCH resource and a second slot for transmitting HARQ-ACK feedback for the first DCI format. In operation 217, the UE may transmit, in the second slot, the HARQ-ACK feedback for the first DCI format on the first PUCCH resource.

In some embodiments of the present disclosure, the configuration information may configure a PUCCH resource specifically for the UE. The first PUCCH resource on which the HARQ-ACK feedback for the first DCI format is transmitted may be the PUCCH resource specifically for the UE as configured in the configuration information. For example, each of the plurality of UEs may be configured with a corresponding UE-specific PUCCH resource.

In some embodiments of the present disclosure, to determine the second slot, the UE may determine a HARQ-ACK feedback timing value which indicates an offset between the first slot and the second slot. Then, the UE may determine the second slot based on the first slot and the HARQ-ACK feedback timing value.

In some examples, the configuration information may configure the HARQ-ACK feedback timing value (e.g., HARQ-ACK feedback timing value k1 as described above) to the UE. In some examples, the first DCI format may include an indicator indicating the HARQ-ACK feedback timing value from a set of HARQ-ACK feedback timing values. The set of HARQ-ACK feedback timing values may be configured in the configuration information or predefined. The indicator may be the activation DCI HARQ-ACK feedback timing indicator as described above. For example, the PUCCH resource indicator in the first DCI format may be reinterpreted as the indicator.

In some embodiments of the present disclosure, the UE may further receive an SPS PDSCH in a third slot according to the SPS PDSCH configuration. The SPS PDSCH may be received by the plurality of UEs including the UE. The UE may transmit HARQ-ACK feedback for the SPS PDSCH on the first PUCCH resource in a fourth slot. The fourth slot may be determined based on the third slot and an offset (e.g., PDSCH-to-HARQ_timing indicator) indicated by the first DCI format.

In some embodiments of the present disclosure, ACK-only based HARQ-ACK feedback may be applied for HARQ-ACK feedback for the SPS PDSCH. For example, the UE may transmit an ACK for the SPS PDSCH on the first PUCCH resource in response to the SPS PDSCH being successfully received by the UE. The UE may transmit nothing (or not transmit any HARQ-ACK feedback) on the first PUCCH resource in response to the SPS PDSCH not being successfully received by the UE.

In some embodiments of the present disclosure, NACK-only based HARQ-ACK feedback may be applied for HARQ-ACK feedback for the SPS PDSCH. For example, the UE may transmit a NACK for the SPS PDSCH on the first PUCCH resource in response to the SPS PDSCH not being successfully received by the UE. The UE may transmit nothing (or not transmit any HARQ-ACK feedback) on the first PUCCH resource in response to the SPS PDSCH being successfully received by the UE.

In some embodiments of the present disclosure, ACK/ NACK based HARQ-ACK feedback may be applied for HARQ-ACK feedback for the SPS PDSCH. For example, the UE may transmit an ACK for the SPS PDSCH on the first PUCCH resource in response to the SPS PDSCH being successfully received by the UE, and may transmit a NACK for the SPS PDSCH on a second PUCCH resource in response to the SPS PDSCH not being successfully received by the UE. In another example, the UE may transmit an ACK for the SPS PDSCH on the second PUCCH resource in response to the SPS PDSCH being successfully received by the UE, and may transmit a NACK for the SPS PDSCH on the first PUCCH resource in response to the SPS PDSCH not being successfully received by the UE.

The second PUCCH may be configured in the configuration information. In some examples, the second PUCCH resource may be specifically configured for the UE. In some examples, the second PUCCH resource may be shared by the plurality of UEs.

In some embodiments of the present disclosure, the UE may further receive, in a fifth slot, a second DCI format for deactivating the SPS PDSCH configuration. The second DCI format may be received by the plurality of UEs including the UE. The UE may transmit HARQ-ACK feedback for the second DCI format on the first PUCCH resource in a sixth slot. The sixth slot may be determined based on the fifth slot and a HARQ-ACK feedback timing value, which indicates an offset between the fifth slot and the sixth slot.

In some examples, the configuration information may configure the HARQ-ACK feedback timing value (e.g., HARQ-ACK feedback timing value k2 as described above) to the UE.

In some examples, the second DCI format may include an indicator indicating the HARQ-ACK feedback timing value from a set of HARQ-ACK feedback timing values. The set of HARQ-ACK feedback timing values may be configured in the configuration information or predefined. The indicator may be the deactivation DCI HARQ-ACK feedback timing indicator as described above. For example, the PDSCH-to-HARQ_feedback timing indicator in the second DCI format may be the indicator or the PUCCH resource indicator in the second DCI format may be reinterpreted as the indicator.

It should be appreciated by persons skilled in the art that the sequence of the operations in exemplary procedure 200 may be changed and some of the operations in exemplary procedure 200 may be eliminated or modified, without departing from the spirit and scope of the disclosure.

FIG. 3 illustrates a flow chart of an exemplary procedure 300 for wireless communications in accordance with some embodiments of the present disclosure. Details described in all of the foregoing embodiments of the present disclosure are applicable for the embodiments shown in FIG. 3. In some examples, the procedure may be performed by a UE, for example, UE 101 in FIG. 1.

Referring to FIG. 3, in operation 311, a UE may receive a plurality of PDSCHs. The plurality of PDSCHs may include one or more of: a first set of multicast SPS PDSCHs, a second set of unicast SPS PDSCHs, a third set of unicast dynamically scheduled PDSCHs.

In operation 313, the UE may generate a HARQ-ACK codebook for the plurality of PDSCHs. The HARQ-ACK codebook may include HARQ-ACK information bits for each PDSCH of the plurality of PDSCHs.

In some embodiments of the present disclosure, to generate the HARQ-ACK codebook, the UE may perform one or more of the following operations:

(1-1) among HARQ-ACK information bits for the first set of multicast SPS PDSCHs, arranging HARQ-ACK information bits for multicast SPS PDSCHs associated with the same SPS PDSCH configuration according to their respective reception times by the UE;

(1-2) among HARQ-ACK information bits for the first set of multicast SPS PDSCHs, arranging HARQ-ACK information bits for multicast SPS PDSCHs associated with different SPS PDSCH configurations according to their respective activation DCI formats;

(1-3) among HARQ-ACK information bits for the second set of unicast SPS PDSCHs, arranging HARQ-ACK information bits for unicast SPS PDSCHs associated with the same SPS PDSCH configuration according to their respective reception times by the UE;

(1-4) among HARQ-ACK information bits for the second set of unicast SPS PDSCHs, arranging HARQ-ACK information bits for unicast SPS PDSCHs associated with different SPS PDSCH configurations according to their respective activation DCI formats;

(1-5) among HARQ-ACK information bits for the first set of multicast SPS PDSCHs and the second set of unicast SPS PDSCHs, arranging the HARQ-ACK information bits according to their respective activation DCI formats;

(1-6) (1-6) among HARQ-ACK information bits for the first set of multicast SPS PDSCHs and the second set of unicast SPS PDSCHs, generating a first sub-codebook comprising HARQ-ACK information bits for the first set of multicast SPS PDSCHs and a second sub-codebook comprising HARQ-ACK information bits for the second set of unicast SPS PDSCHs;

(1-7) among HARQ-ACK information bits for the first set of multicast SPS PDSCHs and the third set of unicast dynamically scheduled PDSCHs, arranging the HARQ-ACK information bits according to activation DCI formats for the multicast SPS PDSCHs and DCI formats for scheduling the unicast dynamically scheduled PDSCHs; and (1-8) among HARQ-ACK information bits for the first set of multicast SPS PDSCHs and the third set of unicast dynamically scheduled PDSCHs, generating a first sub-codebook comprising HARQ-ACK information bits for the first set of multicast SPS PDSCHs and a third sub-codebook comprising HARQ-ACK information bits for the third set of unicast dynamically scheduled PDSCHs.

For example, in the case that the plurality of PDSCHs includes a first set of multicast SPS PDSCHs and a second set of unicast SPS PDSCHs, in some cases, the UE may generate the first and second sub-codebooks according to operation (1-6). In the first sub-codebook, HARQ-ACK information bits may be arranged according to operation (1-1), operation (1-2), or a combination thereof. In the second sub-codebook, HARQ-ACK information bits may be arranged according to operation (1-3), operation (1-4), or a combination thereof.

In some other cases, the UE may generate the HARQ-ACK codebook according to operation (1-5). However, in the case that the first set of multicast SPS PDSCHs includes a plurality of multicast SPS PDSCHs with the same SPS PDSCH configuration, HARQ-ACK information bits for the plurality of multicast SPS PDSCHs may be arranged according to operation (1-1). In the case that the second set of unicast SPS PDSCHs includes a plurality of unicast SPS PDSCHs with the same SPS PDSCH configuration, HARQ-ACK information bits for the plurality of multicast SPS PDSCHs may be arranged according to operation (1-3).

In some embodiments of the present disclosure, arranging the HARQ-ACK information bits according to the respective activation DCI formats, DCI formats for scheduling the unicast dynamically scheduled PDSCHs, or a combination thereof may include arranging the HARQ-ACK information bits based on DAIs in the DCI formats.

In some embodiments of the present disclosure, generating the HARQ-ACK codebook may include one of: placing the first sub-codebook in the beginning of the HARQ-ACK codebook; placing the second sub-codebook in the beginning of the HARQ-ACK codebook; and placing the third sub-codebook in the beginning of the HARQ-ACK codebook.

In operation 315, the UE may transmit the HARQ-ACK codebook.

It should be appreciated by persons skilled in the art that the sequence of the operations in exemplary procedure 300 may be changed and some of the operations in exemplary procedure 300 may be eliminated or modified, without departing from the spirit and scope of the disclosure.

FIG. 4 illustrates a flow chart of an exemplary procedure 400 for wireless communications in accordance with some embodiments of the present disclosure. Details described in all of the foregoing embodiments of the present disclosure are applicable for the embodiments shown in FIG. 4. In some examples, the procedure may be performed by a BS, for example, BS 102 in FIG. 1.

Referring to FIG. 4, in operation 411, a BS may transmit, to a UE, configuration information for an SPS PDSCH configuration. In operation 413, the BS may transmit, to a plurality of UEs including the UE, a first DCI format in a first slot for activating the SPS PDSCH configuration. In operation 415, the BS may receive, from the UE, HARQ-ACK feedback for the first DCI format on a first PUCCH resource in a second slot.

In some embodiments of the present disclosure, the configuration information may configure a PUCCH resource specifically for the UE. The first PUCCH resource on which the HARQ-ACK feedback for the first DCI format is transmitted may be the PUCCH resource specifically for the UE as configured in the configuration information. For example, the BS may configure a corresponding UE-specific PUCCH resource to each of the plurality of UEs.

In some embodiments of the present disclosure, the second slot may be determined based on the first slot and a HARQ-ACK feedback timing value indicating an offset between the first slot and the second slot.

In some examples, the configuration information may configure the HARQ-ACK feedback timing value (e.g., HARQ-ACK feedback timing value k1 as described above). In some examples, the first DCI format may include an indicator indicating the HARQ-ACK feedback timing value from a set of HARQ-ACK feedback timing values. The set of HARQ-ACK feedback timing values may be configured in the configuration information or predefined. The indicator may be the activation DCI HARQ-ACK feedback timing indicator as described above. For example, the PUCCH resource indicator in the first DCI format may be reinterpreted as the indicator.

In some embodiments of the present disclosure, the BS may further transmit to the plurality of UEs including the UE, an SPS PDSCH in a third slot according to the SPS PDSCH configuration. The BS may receive, from the UE, HARQ-ACK feedback for the SPS PDSCH on the first PUCCH resource in a fourth slot. The fourth slot may be determined based on the third slot and an offset (e.g., PDSCH-to-HARQ_timing indicator) indicated by the first DCI format.

In some embodiments of the present disclosure, ACK-only based HARQ-ACK feedback may be applied. For example, the BS may receive an ACK for the SPS PDSCH on the first PUCCH resource in response to the SPS PDSCH being successfully received by the UE. The BS may receive nothing (or not receive any HARQ-ACK feedback) on the first PUCCH resource in response to the SPS PDSCH not being successfully received by the UE.

In some embodiments of the present disclosure, NACK-only based HARQ-ACK feedback may be applied. For example, the BS may receive a NACK for the SPS PDSCH on the first PUCCH resource in response to the SPS PDSCH not being successfully received by the UE. The BS may receive nothing (or not receive any HARQ-ACK feedback) on the first PUCCH resource in response to the SPS PDSCH being successfully received by the UE.

In some embodiments of the present disclosure, ACK/NACK based HARQ-ACK feedback may be applied. For example, the BS may receive an ACK for the SPS PDSCH on the first PUCCH resource in response to the SPS PDSCH being successfully received by the UE, and may receive a NACK for the SPS PDSCH on a second PUCCH resource in response to the SPS PDSCH not being successfully received by the UE. In another example, the BS may receive an ACK for the SPS PDSCH on the second PUCCH resource in response to the SPS PDSCH being successfully received by the UE, and may receive a NACK for the SPS PDSCH on the first PUCCH resource in response to the SPS PDSCH not being successfully received by the UE.

The second PUCCH may be configured in the configuration information. In some examples, the second PUCCH resource may be specifically configured for the UE. For example, for each UE of the plurality of UEs, the BS may configure a different second PUCCH resource. In some examples, the second PUCCH resource may be shared by the plurality of UEs.

In some embodiments of the present disclosure, the BS may transmit, to the plurality of UEs including the UE, a second DCI format in a fifth slot for deactivating the SPS PDSCH configuration. The BS may receive, from the UE, HARQ-ACK feedback for the second DCI format on the first PUCCH resource in a sixth slot. The sixth slot may be determined based on the fifth slot and a HARQ-ACK feedback timing value indicating an offset between the fifth slot and the sixth slot.

In some examples, the configuration information may indicate the HARQ-ACK feedback timing value (e.g., HARQ-ACK feedback timing value k2 as described above).

In some examples, the second DCI format may include an indicator indicating the HARQ-ACK feedback timing value from a set of HARQ-ACK feedback timing values. The set of HARQ-ACK feedback timing values may be configured in the configuration information or predefined. The indicator may be the deactivation DCI HARQ-ACK feedback timing indicator as described above. For example, The PDSCH-to-HARQ_feedback timing indicator in the second DCI format may be the indicator or the PUCCH resource indicator in the second DCI format may be reinterpreted as the indicator.

It should be appreciated by persons skilled in the art that the sequence of the operations in exemplary procedure 400 may be changed and some of the operations in exemplary procedure 400 may be eliminated or modified, without departing from the spirit and scope of the disclosure.

FIG. 5 illustrates a flow chart of an exemplary procedure 500 for wireless communications in accordance with some embodiments of the present disclosure. Details described in all of the foregoing embodiments of the present disclosure are applicable for the embodiments shown in FIG. 5. In some examples, the procedure may be performed by a BS, for example, BS 102 in FIG. 1.

Referring to FIG. 5, in operation 511, a BS may transmit, to a UE, a plurality of PDSCHs. The plurality of PDSCHs may include one or more of: a first set of multicast SPS PDSCHs, a second set of unicast SPS PDSCHs, a third set of unicast dynamically scheduled PDSCHs. The first set of multicast SPS PDSCHs may be transmitted to a plurality of UEs including the UE.

In operation 513, the BS may receive a HARQ-ACK codebook for the plurality of PDSCHs. The HARQ-ACK codebook may include HARQ-ACK information bits for each PDSCH of the plurality of PDSCHs.

In some embodiments of the present disclosure, the HARQ-ACK codebook may include one or more of:

(2-1) among HARQ-ACK information bits for the first set of multicast SPS PDSCHs, HARQ-ACK information bits for multicast SPS PDSCHs associated with the same SPS PDSCH configuration are arranged according to their respective reception times by the UE;

(2-2) among HARQ-ACK information bits for the first set of multicast SPS PDSCHs, HARQ-ACK information bits for multicast SPS PDSCHs associated with different SPS PDSCH configurations are arranged according to their respective activation DCI formats;

(2-3) among HARQ-ACK information bits for the second set of unicast SPS PDSCHs, HARQ-ACK information bits for unicast SPS PDSCHs associated with the same SPS PDSCH configuration are arranged according to their respective reception times by the UE;

(2-4) among HARQ-ACK information bits for the second set of unicast SPS PDSCHs, HARQ-ACK information bits for unicast SPS PDSCHs associated with different SPS PDSCH configurations are arranged according to their respective activation DCI formats;

(2-5) among HARQ-ACK information bits for the first set of multicast SPS PDSCHs and the second set of unicast SPS PDSCHs, the HARQ-ACK information bits are arranged according to their respective activation DCI formats;

(2-6) among HARQ-ACK information bits for the first set of multicast SPS PDSCHs and the second set of unicast SPS PDSCHs, the HARQ-ACK codebook comprises a first sub-codebook comprising HARQ-ACK information bits for the first set of multicast SPS PDSCHs and a second sub-codebook comprising HARQ-ACK information bits for the second set of unicast SPS PDSCHs;

(2-7) among HARQ-ACK information bits for the first set of multicast SPS PDSCHs and the third set of unicast dynamically scheduled PDSCHs, the HARQ-ACK information bits are arranged according to activation DCI formats for the multicast SPS PDSCHs and DCI formats for scheduling the unicast dynamically scheduled PDSCHs; and (2-8) among HARQ-ACK information bits for the first set of multicast SPS PDSCHs and the third set of unicast dynamically scheduled PDSCHs, the HARQ-ACK codebook comprises a first sub-codebook comprising HARQ-ACK information bits for the first set of multicast SPS PDSCHs and a third sub-codebook comprising HARQ-ACK information bits for the third set of unicast dynamically scheduled PDSCHs.

In some embodiments of the present disclosure, the HARQ-ACK information bits may be arranged based on DAIs in the activation DCI formats, DAIs in DCI formats for scheduling the unicast dynamically scheduled PDSCHs, or a combination thereof.

In some embodiments of the present disclosure, the first sub-codebook may be placed in the beginning of the HARQ-ACK codebook. In some other embodiments of the present disclosure, the second sub-codebook may be placed in the beginning of the HARQ-ACK codebook. In yet other embodiments of the present disclosure, the third sub-codebook may be placed in the beginning of the HARQ-ACK codebook.

It should be appreciated by persons skilled in the art that the sequence of the operations in exemplary procedure 500 may be changed and some of the operations in exemplary procedure 500 may be eliminated or modified, without departing from the spirit and scope of the disclosure.

Figure 6:
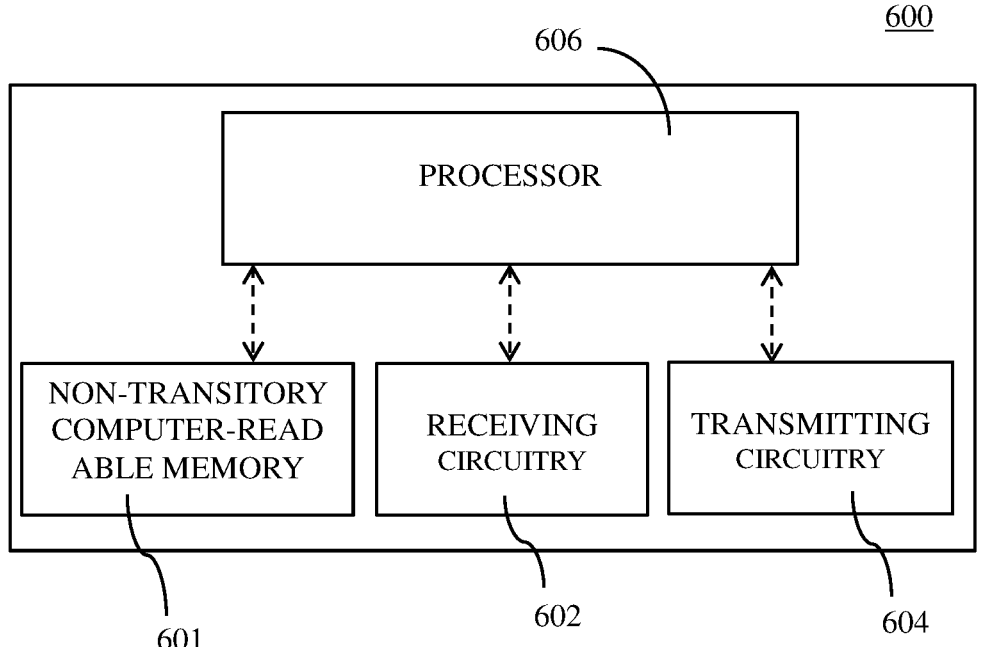
FIG. 6 illustrates a block diagram of an exemplary apparatus in accordance with some embodiments of the present disclosure.

FIG. 6 illustrates a block diagram of an exemplary apparatus 600 according to some embodiments of the present disclosure.

As shown in FIG. 6, the apparatus 600 may include at least one non-transitory computer-readable medium 601, at least one receiving circuitry 602, at least one transmitting circuitry 604, and at least one processor 606 coupled to the non-transitory computer-readable medium 601, the receiving circuitry 602 and the transmitting circuitry 604. The apparatus 600 may be a base station side apparatus (e.g., a BS) or a communication device (e.g., a UE).

Although in this figure, elements such as the at least one processor 606, transmitting circuitry 604, and receiving circuitry 602 are described in the singular, the plural is contemplated unless a limitation to the singular is explicitly stated. In some embodiments of the present application, the receiving circuitry 602 and the transmitting circuitry 604 are combined into a single device, such as a transceiver. In certain embodiments of the present application, the apparatus 600 may further include an input device, a memory, and/or other components.

In some embodiments of the present disclosure, the non-transitory computer-readable medium 601 may have stored thereon computer-executable instructions to cause a processor to implement the method with respect to the UEs as described above. For example, the computer-executable instructions, when executed, cause the processor 606 interacting with receiving circuitry 602 and transmitting circuitry 604, so as to perform the operations with respect to the UEs described in FIGS. 1-5.

In some embodiments of the present disclosure, the non-transitory computer-readable medium 601 may have stored thereon computer-executable instructions to cause a processor to implement the method with respect to the BSs as described above. For example, the computer-executable instructions, when executed, cause the processor 606 interacting with receiving circuitry 602 and transmitting circuitry 604, so as to perform the operations with respect to the BSs described in FIGS. 1-5.

Those having ordinary skill in the art would understand that the operations or steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the operations or steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in other embodiments. Also, all of the elements of each figure are not necessary for the operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including." Expressions such as "A and/or B" or "at least one of A and B" may include any and all combinations of words enumerated along with the expression. For instance, the expression "A and/or B" or "at least one of A and B" may include A, B, or both A and B. The wording "the first," "the second" or the like is only used to clearly illustrate the embodiments of the present application, but is not used to limit the substance of the present application.

What is claimed:

1. A method performed by a user equipment (UE), the method comprising:

receiving configuration information for a semi-persistent scheduling (SPS) physical downlink shared channel (PDSCH) configuration;

receiving, in a first slot, a downlink control information (DCI) format for activating the SPS PDSCH configuration, wherein the DCI format is associated with a plurality of UEs including the UE;

determining, based on the configuration information, a physical uplink control channel (PUCCH) resource and a second slot for transmitting hybrid automatic repeat request acknowledgement (HARQ-ACK) feedback for the DCI format; and transmitting, in the second slot, the HARQ-ACK feedback for the DCI format on the PUCCH resource.

2. The method of claim 1, wherein the configuration information configures the PUCCH resource specifically for the UE.

3. The method of claim 1, wherein determining the second slot comprises:

determining a HARQ-ACK feedback timing value that indicates an offset between the first slot and the second slot; and determining the second slot based on the first slot and the HARQ-ACK feedback timing value.

4. The method of claim 3, wherein the DCI format includes an indicator indicating the HARQ-ACK feedback timing value from a set of HARQ-ACK feedback timing values.

5. A user equipment (UE) for wireless communication, comprising:

at least one memory; and at least one processor coupled with the at least one memory and configured to cause the UE to:

receive configuration information for a semi-persistent scheduling (SPS) physical downlink shared channel (PDSCH) configuration;

receive, in a first slot, a downlink control information (DCI) format for activating the SPS PDSCH configuration, wherein the DCI format is associated with a plurality of UEs including the UE;

determine, based on the configuration information, a physical uplink control channel (PUCCH) resource and a second slot for transmitting hybrid automatic repeat request acknowledgement (HARQ-ACK) feedback for the DCI format; and transmit, in the second slot, the HARQ-ACK feedback for the DCI format on the PUCCH resource.

6. The UE of claim 5, wherein the configuration information configures the PUCCH resource specifically for the UE.

7. The UE of claim 5, wherein to determine the second slot, the at least one processor is configured to cause the UE to:

determine a HARQ-ACK feedback timing value that indicates an offset between the first slot and the second slot; and determine the second slot based on the first slot and the HARQ-ACK feedback timing value.

8. The UE of claim 7, wherein the DCI format includes an indicator indicating the HARQ-ACK feedback timing value from a set of HARQ-ACK feedback timing values.

9. The UE of claim 5, wherein the at least one processor is further configured to cause the UE to:

receive an SPS PDSCH in a third slot according to the SPS PDSCH configuration, wherein the SPS PDSCH is associated with the plurality of UEs including the UE; and transmit HARQ-ACK feedback for the SPS PDSCH on the PUCCH resource in a fourth slot.

10. The UE of claim 9, wherein the at least one processor is further configured to cause the UE to determine the fourth slot based on the third slot and an offset indicated by the DCI format.

11. The UE of claim 9, wherein to transmit the HARQ-ACK feedback for the SPS PDSCH, the at least one processor is configured to cause the UE to at least one of:

transmit an acknowledgement (ACK) for the SPS PDSCH on the PUCCH resource in response to successfully receiving the SPS PDSCH;

transmit nothing on the PUCCH resource in response to not successfully receiving the SPS PDSCH;

transmit a negative ACK (NACK) for the SPS PDSCH on the PUCCH resource in response to not successfully receiving the SPS PDSCH; or transmit the ACK for the SPS PDSCH on the PUCCH resource or an additional PUCCH resource in response to successfully receiving the SPS PDSCH, and transmit the NACK for the SPS PDSCH on the additional PUCCH resource or the PUCCH resource in response to not successfully receiving the SPS PDSCH, wherein the configuration information configures the additional PUCCH resource.

12. The UE of claim 9, wherein the at least one processor is further configured to cause the UE to:

receive, in a fifth slot, an additional DCI format for deactivating the SPS PDSCH configuration, wherein the additional DCI format is associated with the plurality of UEs including the UE; and transmit additional HARQ-ACK feedback for the additional DCI format on the PUCCH resource in a sixth slot.

13. The UE of claim 12, wherein the at least one processor is further configured to cause the UE to determine the sixth slot based on the fifth slot and a HARQ-ACK feedback timing value that indicates an offset between the fifth slot and the sixth slot.

14. A method performed by a base station (BS), the method comprising:

transmitting configuration information for a semi-persistent scheduling (SPS) physical downlink shared channel (PDSCH) configuration;

transmitting, to a plurality of user equipment (UEs) and in a first slot, a downlink control information (DCI) format for activating the SPS PDSCH configuration;

determining, based on the configuration information, a physical uplink control channel (PUCCH) resource and a second slot for receiving hybrid automatic repeat request acknowledgement (HARQ-ACK) feedback for the DCI format; and receiving, in the second slot, the HARQ-ACK feedback for the DCI format on the PUCCH resource.

15. A base station (BS) for wireless communication, comprising:

at least one memory; and at least one processor coupled with the at least one memory and configured to cause the BS to:

transmit configuration information for a semi-persistent scheduling (SPS) physical downlink shared channel (PDSCH) configuration;

transmit, to a plurality of user equipment (UEs) and in a first slot, a downlink control information (DCI) format for activating the SPS PDSCH configuration;

determine, based on the configuration information, a physical uplink control channel (PUCCH) resource and a second slot for receiving hybrid automatic repeat request acknowledgement (HARQ-ACK) feedback for the DCI format; and receive, in the second slot, the HARQ-ACK feedback for the DCI format on the PUCCH resource.

16. The BS of claim 15, wherein to determine the second slot, the at least one processor is configured to cause the BS to:

determine a HARQ-ACK feedback timing value that indicates an offset between the first slot and the second slot; and determine the second slot based on the first slot and the HARQ-ACK feedback timing value.

17. The BS of claim 16, wherein the DCI format includes an indicator indicating the HARQ-ACK feedback timing value from a set of HARQ-ACK feedback timing values.

18. The BS of claim 15, wherein the at least one processor is further configured to cause the BS to:

transmit, to the plurality of UEs, an SPS PDSCH in a third slot according to the SPS PDSCH configuration; and receive, from at least one UE of the plurality of UEs, HARQ-ACK feedback for the SPS PDSCH on the PUCCH resource in a fourth slot.

19. The BS of claim 18, wherein to receive the HARQ-ACK feedback for the SPS PDSCH, the at least one processor is configured to cause the BS to at least one of:

receive an acknowledgement (ACK) for the SPS PDSCH on the PUCCH resource in response to the SPS PDSCH being successfully received by the at least one UE;

receive nothing on the PUCCH resource in response to the SPS PDSCH not being successfully received by the at least one UE;

receive a negative ACK (NACK) for the SPS PDSCH on the PUCCH resource in response to the SPS PDSCH not being successfully received by the at least one UE; or receive the ACK for the SPS PDSCH on the PUCCH resource or an additional PUCCH resource in response to the SPS PDSCH being successfully received by the at least one UE, and receive the NACK for the SPS PDSCH on the additional PUCCH resource or the PUCCH resource in response to the SPS PDSCH not being successfully received by the at least one UE, wherein the configuration information configures the additional PUCCH resource.

20. The BS of claim 18, wherein the at least one processor is configured to cause the BS to:

transmit, to the plurality of UEs and in a fifth slot, an additional DCI format for deactivating the SPS PDSCH configuration; and receive HARQ-ACK feedback for the additional DCI format on the PUCCH resource in a sixth slot.

* * * * *